United States Patent
Al-Bannai

[19]

[11] Patent Number: 6,001,019
[45] Date of Patent: Dec. 14, 1999

[54] POP-UP DISPLAY

[76] Inventor: Omar Al-Bannai, P.O. Box 240, Salmiya, Kuwait, 22003

[21] Appl. No.: 09/273,574

[22] Filed: Mar. 22, 1999

[51] Int. Cl.$^6$ ................................................. A63H 37/00
[52] U.S. Cl. ............................. 472/54; 446/310; 446/148
[58] Field of Search .................................. 472/51, 54, 55, 472/137; 446/310, 486, 34, 148; 40/124.1, 124.06, 124.08

[56] References Cited

U.S. PATENT DOCUMENTS

| | | |
|---|---|---|
| 608,794 | 8/1898 | Quinn . |
| 842,659 | 1/1907 | Haverman ................. 446/310 |
| 978,489 | 12/1910 | Salmond . |
| 2,233,119 | 2/1941 | Anderson . |
| 3,586,320 | 6/1971 | Mace . |
| 5,120,263 | 6/1992 | Ierfino et al. ..................... 446/486 |

*Primary Examiner*—Kien T. Nguyen
*Attorney, Agent, or Firm*—Dougherty & Troxell

[57] ABSTRACT

A pop-up display comprises a generally box like hollow member having an open end at the top thereof and a pivotal flap or flaps for opening and closing the open end thereof. A spring biased pop-up display includes a first coil spring which is disposed on a first axis and held in a compressed position by at least one of the flaps when the flap or flaps are in a closed position. A strap or thread is stretched across the flaps to hold the flaps in a closed position. The spring biased pop-up display includes a pleated paper banner having opposite ends with a second coil spring disposed between the opposite ends and with its axis essentially perpendicular to the axis of the first spring. A candle or sparkler engages the flap or thread and upon ignition burns through the strap or thread. When the strap or thread is broken the first spring pushes the display upwardly to thereby allow the second spring to expand the pleated paper banner outwardly beyond the confines of the hollow chamber.

9 Claims, 2 Drawing Sheets

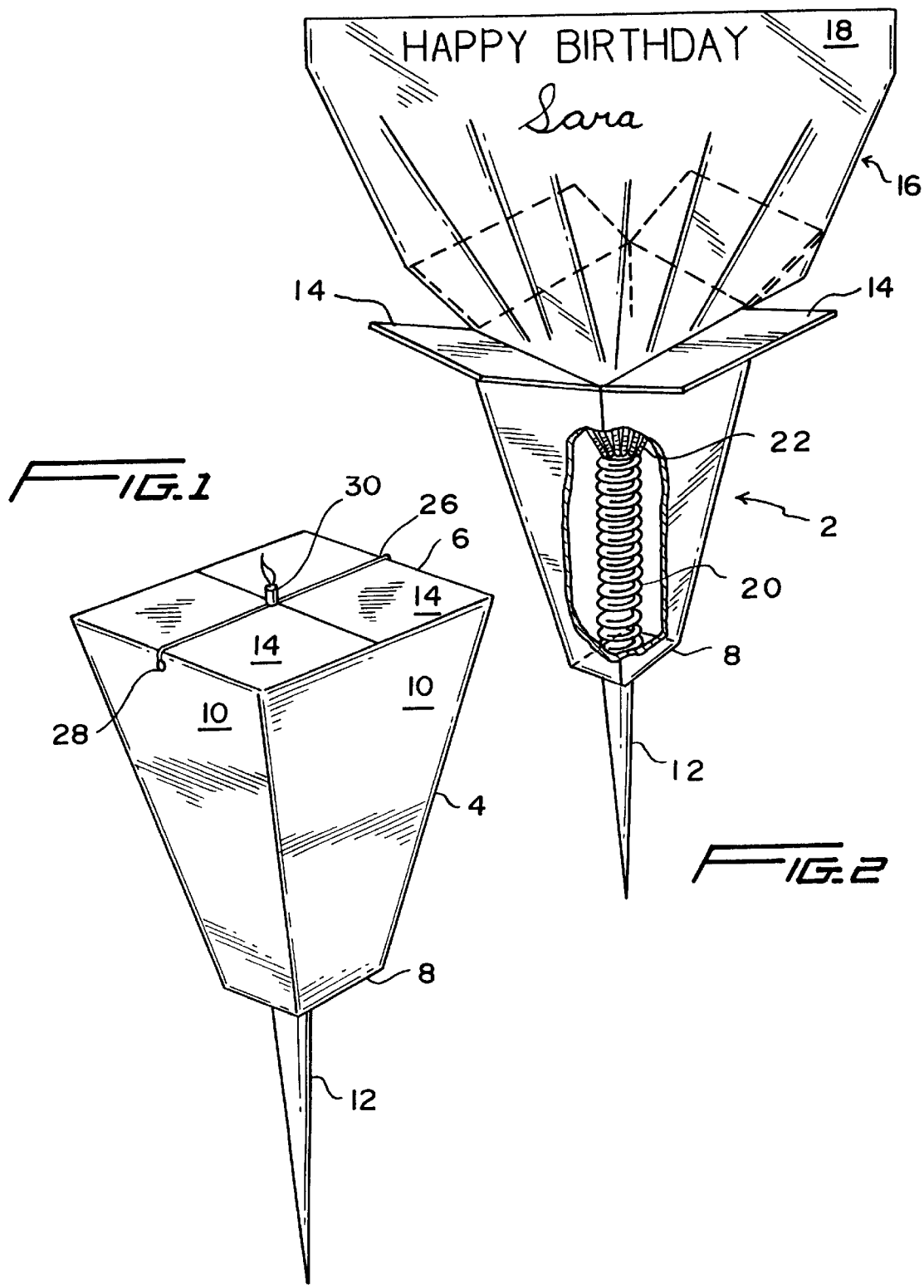

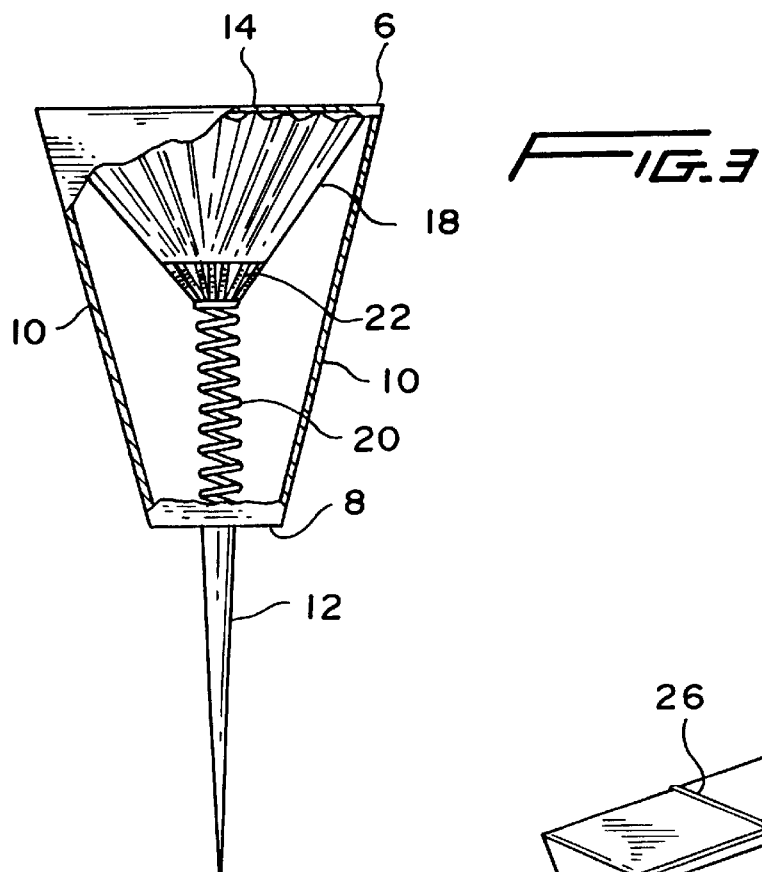
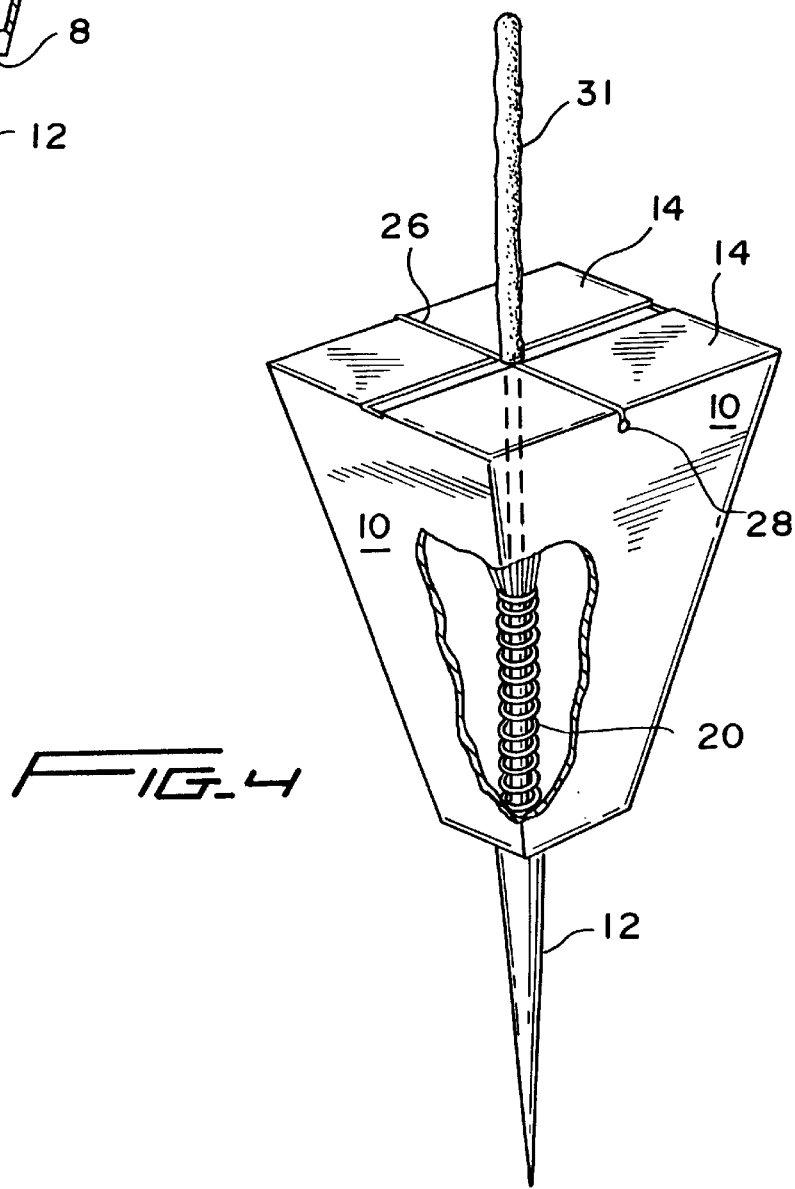

POP-UP DISPLAY

FIELD OF THE INVENTION

This invention relates to a novel pop-up display and more particularly to a heat or flame actuated pop-up decoration for use on a birthday cake or the like.

BACKGROUND FOR THE INVENTION

Pop-up decorations for pastries have been known for many years. For example, a U.S. Pat. No. 2,233,119 of M. Anderson discloses a pop-up decoration which provides a surprise for festive occasions. The decoration disclosed therein includes a short candle which when lit will burn for a short time and then permit a furled banner to be projected out of the top of a tube which carries the candle.

A more recent pop-up candle device is disclosed in the U.S. Pat. No. 3,586,320 of John Mason. That device includes inner and outer spring biased telescoping sections. The inner section carries a candle mounted thereon and a pivotal arm carrying a furled banner which is concealed within the telescoping sections when the sections are compressed or telescoped. Then the pivotal arm is free to swing downward when the sections are extended and the banner unfurls.

It is presently believed that there may be a significant commercial market for an improved pop-up decoration which is relatively simple in design and which can be sold for a nominal price. It is also believed that a pop-up candle decoration according to the present invention can be made of relatively inexpensive materials, made at a modest cost and at the same time provide a festive pop-up surprise for festive occasions. The flame or heat actuated pop-up decorations in accordance with the present invention are also adaptable for different occasions and readily customized for an individual event. In addition, the decorations can be manufactured in very small sizes and are relatively lite in weight so that they can be used as decorations for birthday cakes or the like and readily removed therefrom before cutting the cake. The decorations are also readily disposable and in this sense are environmentally friendly.

SUMMARY OF THE INVENTION

In essence, the present invention contemplates a pop-up display or decoration for a birthday cake or the like. The pop-up candle decoration includes means defining a hollow chamber with a top and bottom. Means are also provided for enclosing the chamber. For example, in one embodiment of the invention the hollow chamber is surrounded by four sides. Means are also included for defining an opening in the top of the chamber and means such as one or more pivotal flaps extend over the opening in the top in order to open and close the chamber. A first spring which is compressible and expandable along a first axis is disposed within the chamber with one end thereof at the bottom of the chamber. An expandable pop-up display such as a pleated paper banner is disposed at an opposite end of the spring and within the chamber when the spring is in a compressed state. A second spring which is compressible and expandable along an axis which is essentially transverse of the first axis is disposed between the opposite ends of the display. The second spring expands the display outwardly when the display is pushed upwardly into an upper portion of the chamber or out of the chamber by the first spring. The pop-up decoration also includes a thread like strap such as a piece of elastic, cotton, rayon or nylon thread for maintaining one or more pivotal flaps in a closed position. The closed flap or flaps retain the first and second springs in the chamber in a compressed state. A heat activating member such as a candle, sparkler or other incendiary device is constructed and arranged to engage the thread for releasing the flap or flaps. For example, the heat or flame of the candle burns through the thread to allow the first spring to expand and push the pop-up display out of the chamber. Then, as the display is lifted or pushed out of the chamber, the second spring is pushed upwardly into a wider portion of the hollow chamber or out of the chamber so that it is free to expand and spread the banner outwardly beyond the confines of the chamber in a surprising and festive manner.

In a preferred embodiment of the invention, the pop-up display or cake decoration has a generally box like shape such as a parallelepiped and includes a downwardly extending projection which is adapted to penetrate a cake or other pastry and hold the decoration in place thereon. The display is constructed of a relatively thin cardboard or stiff paper and includes a pair of very lite coil springs which may be of fine wire or plastic. The top of the display also includes four flaps which are constructed and arranged in a normal box like construction wherein two of the four flaps overlap the other two. And in the case of using a sparkler as the incendiary, the flaps provide a small opening at their points of intersection, so that the body of the sparkler can extend down into the chamber.

DESCRIPTION OF THE DRAWINGS

FIG. 1 is a perspective view of a pop-up decoration in accordance with a first embodiment of the invention and wherein the pop-up portion of the decoration is confined within the body of the decoration;

FIG. 2 is a perspective view of a pop-up decoration in accordance with a first embodiment of the invention and wherein the pop-up portion of the decoration has been extended upwardly and outwardly from the body of the device;

FIG. 3 is a cross sectional view of the pop-up decoration shown in FIGS. 1 and 2 which shows a transverse spring structure for expanding the display outwardly from the body of the decoration; and FIG. 4 is a perspective view illustrating a second embodiment of the invention.

DETAILED DESCRIPTION OF THE PREFERRED EMBODIMENTS OF THE INVENTION

The invention will now be described in connection with the accompanying drawings wherein like reference numerals have been used to designate like parts. As shown in FIG. 1, a pop-up display or decoration 2 comprises a hollow box-like structure 4 which is preferably constructed of light cardboard, heavy paper or other suitable material. The structure 4 includes a top 6 and bottom 8 as well as four sides 10. As illustrated, the structure has a generally square cross-section. The square cross-section is not critical and it should be recognized that the display or decoration can be manufactured with a rectangular, oval or circular cross-section. Nevertheless, it is presently believed that a square cross-section provides a pleasing appearance and may facilitate manufacturing the decorations at a nominal cost.

As shown in FIGS. 1 and 2, the box-like structure 4 includes four sides 10 each of which defines an inverted trapezoid wherein the larger dimension or base of the trapezoid is at the top of the decoration. In other words, the box-like structure 4 has a frusto pyramidal shape or, to be more specific, a shape which defines the frustum of an inverted pyramid.

The decoration 2 also includes a downwardly extending spike-like mounting element 12 which may be of plastic or other suitable material. Preferably, the mounting element 12 is made of a biodegradable material which should have sufficient rigidity to be pushed into a cake or pastry. This element 12 is constructed and arranged to hold the decoration 2 in an upright position in a birthday cake or the like.

One or more pivotal flaps 14 are disposed in the top of the decoration 2 for opening and closing the box-like structure 4. The flaps 14 (shown more clearly in FIG. 2) overlap one another in a conventional manner. For example, two of the flaps 14 which are on opposite sides of the box-like structure 4 are folded inwardly and then the remaining two opposite flaps 14 are folded inwardly towards one another but on top of the first two to thereby close the structure 4 as shown in FIG. 1. Closing the flaps 14 forms a hollow chamber which contains a pop-up display as will be described below.

FIG. 2 shows a pop-up display or decoration 2 wherein the pop-up portion 16 is in a fully extended position. A display such as a banner 18 may be made of pleated paper or like material. The banner 18 may include a greeting or other design and may be printed with any individual's name. The banner 18 can also include other messages and would typically be manufactured in various formats with a plurality of different messages, designs and names so that a purchaser has a wide selection.

A first spring 20 is disposed in the hollow chamber, i.e., inside the structure 4, and is compressible and expandable along a first or vertical axis. This reference to a vertical axis assumes that the decoration is positioned on a cake or the like in an upright position with its longitudinal axis essentially or generally vertical.

In a preferred embodiment of the invention, the spring 20 is a coil spring which is coaxial with the central or longitudinal axis of the decoration 2. As illustrated, the axis runs through the element 12 and structure 4 and is generally vertical when inserted into a cake.

One end of the spring 20 rests on the bottom 8 of the structure 4. The other end of the spring 20 carries the expandable display or banner 18. The banner 18 is preferably fan shaped and may include a relatively rigid reinforced element (not shown) on its opposite ends or sides as in a typical fan structure. A second spring 22 is disposed between the opposite ends of banner 18 as illustrated more clearly in FIG. 3. As shown therein, the fan-like banner 18 comprises a pleated paper display which is expanded by means of the second spring 22.

The second spring 22 is preferably a very light coil spring which is made of thin wire or plastic. The second spring 22 is disposed between the ends of banner 18 with its axis essentially perpendicular or transverse to the axis of spring 20. The spring 22 is preferably disposed at the bottom of banner 18 and constructed and arranged to expand or spread out banner 18 in a fan-like manner.

The pop-up decoration 2 also includes a heat activated member or strap 26 which may be a relatively thin elastic or thread which extends across flaps 14 when the flaps 14 are in a closed position, i.e., closing the top 6. The strap 26 extends across the flaps 14 and is attached to a pair of buttons 28 (only one of which is shown). A heat activating member 30 such as a candle, sparkler or other incendiary device extends upwardly from the top 6 and is adjacent to if not in abutting relationship with the strap 26.

As shown in FIG. 4, a second embodiment of the invention utilizes a sparkler 31 as the heat activating member. The sparkler is disposed with a base portion 32 passing through the center of the coil spring 20 and is fixed to the bottom 8 of the decoration 2.

In the operation of the decoration in accordance with the present invention, the springs 20 and 22 are compressed and the banner 18 is folded in a Z or accordion fashion within the hollow chamber defined by the sides 10, top 6 and bottom 8. The springs 20 and 22 and banner 18 are then held in place by the flaps 14 which are in turn held down in a closed position by the strap 26. The decoration is then placed on top of a cake or the like and the candle 30 or sparkler 31 is ignited. As the candle 20 or sparkler 31 burns down to the strap 26, the heat or flame burns through the strap 26 thereby releasing the flaps 14 which allows the banner 18 to be pushed upwardly by spring 20 and spread outwardly by spring 22 in an a surprising and festive manner.

While the invention has been described in connection with its preferred embodiments, it should be recognized that changes and modifications may be made without departing from the scope of the appended claims.

What is claimed is:

1. A pop-up candle decoration for a birthday cake comprising a hollow chamber having a top and bottom, an opening in said top and a pivotal flap extending over the opening in said top, a first spring which is compressible and expandable along a first axis disposed within said chamber with one end thereof at the bottom of said chamber, and an expandable pop-up display having opposite ends disposed at an opposite end of said spring and within said chamber when said spring is in a compressed state, a second spring which is compressible and expandable along a second axis which is essentially transverse of said first axis disposed between said opposite ends of said display for expanding said display outwardly when said display is pushed upwardly in said chamber by said first spring and strap means for maintaining said pivotal flap in a first position to thereby close said chamber and retain said first and said second spring in a compressed state and a heat activating member engaging said strap means for releasing said strap means to thereby allow said first spring to expand and push said pop-up display and said second spring upwardly which allows said second spring to expand said display outwardly beyond the confines of said chamber.

2. A pop-up candle decoration for a birthday cake in accordance with claim 1 wherein said hollow chamber has a relatively square cross section and in which said heat activating member is a candle.

3. A pop-up decoration for a birthday cake in accordance with claim 1 wherein said hollow chamber defines a generally rectangular cross section and said heat activating member is a sparkler and wherein said strap is a thread which is broken when a flame from the sparkler touches the thread.

4. A pop-up candle decoration for a birthday cake in accordance with claim 1 which includes mounting means extending downwardly from said bottom of said chamber for mounting the candle decoration on a cake with its first axis in a generally vertical position.

5. A pop-up candle decoration for a birthday cake in accordance with claim 4 wherein said chamber is constructed of relatively lite paper board and wherein said expandable pop up display is made of pleated paper with an indicia thereon.

6. A pop-up display comprising a generally box like hollow member having an open end at the top thereof and a pivotal flap for opening and closing said open end, a spring biased pop-up display including a first spring disposed on a first axis and held in a compressed position by said pivotal flap when said flap is in a closed position, and strap means for maintaining said flap in a closed position, said spring biased pop-up display including a pleated paper banner having opposite ends and a printed message thereon, and a second spring disposed between said opposite ends of said banner on an axis which is essentially perpendicular to said first axis, and incendiary means engaging said strap means so that the incendiary when ignited burns through said strap means which allows said first spring to push the display upwardly out of said hollow member to thereby allow said second spring to expand said pleated paper banner outwardly beyond said hollow member.

7. A pop-up display in accordance with claim 6 wherein said first spring is a coil spring and which includes a mounting spike at the bottom thereof for mounting the display in a generally vertical position on a pastry.

8. A pop-up display in accordance with claim 7 in which said pivotal flap includes a plurality of overlapping flaps.

9. A pop-up display in accordance with claim 8, in which the box like hollow member has the shape of the frustum of an inverted pyramid.

* * * * *